(12) United States Patent
Godfrey

(10) Patent No.: US 11,658,882 B1
(45) Date of Patent: May 23, 2023

(54) ALGORITHM-BASED AUTOMATIC PRESENTATION OF A HIERARCHICAL GRAPHICAL REPRESENTATION OF A COMPUTER NETWORK STRUCTURE

(71) Applicant: VMware, Inc., Palo Alto, CA (US)

(72) Inventor: Philip Brighten Godfrey, Champaign, IL (US)

(73) Assignee: VMware, Inc., Palo Alto, CA (US)

(*) Notice: Subject to any disclaimer, the term of this patent is extended or adjusted under 35 U.S.C. 154(b) by 208 days.

(21) Appl. No.: 16/748,658

(22) Filed: Jan. 21, 2020

(51) Int. Cl.
- *H04L 41/22* (2022.01)
- *H04L 41/12* (2022.01)
- *G06F 3/0484* (2022.01)

(52) U.S. Cl.
CPC ............ *H04L 41/22* (2013.01); *G06F 3/0484* (2013.01); *H04L 41/12* (2013.01)

(58) Field of Classification Search
CPC .............. G06F 16/367; G06F 16/9024; G06F 16/2393; G06F 3/04812; G06F 3/0484; G06F 3/0482; G06F 3/0488; H04L 41/12; H04L 45/04; H04L 43/0811; H04L 41/22; G06Q 30/0271
See application file for complete search history.

(56) References Cited

U.S. PATENT DOCUMENTS

| | | | | |
|---|---|---|---|---|
| 5,845,277 A * | 12/1998 | Pfeil | ....................... | H04L 41/22 |
| 8,719,415 B1 * | 5/2014 | Sirota | ................... | G06F 9/5011 |
| | | | | 709/226 |
| 10,862,749 B1 * | 12/2020 | Kiyak | ..................... | H04L 41/12 |
| 2006/0067337 A1 * | 3/2006 | Netravali | ................ | H04L 45/48 |
| | | | | 370/400 |
| 2006/0165040 A1 * | 7/2006 | Rathod | .................. | G06Q 10/10 |
| | | | | 370/335 |
| 2006/0265508 A1 * | 11/2006 | Angel | ............... | H04L 29/12047 |
| | | | | 709/230 |

(Continued)

FOREIGN PATENT DOCUMENTS

CN 106713003 B * 6/2020 ......... H04L 41/0889

OTHER PUBLICATIONS

Graphviz—Graph Visualization Software, https://www.graphviz.org/theory/.

(Continued)

*Primary Examiner* — Steven P Sax
(74) *Attorney, Agent, or Firm* — Kim & Stewart LLP

(57) ABSTRACT

Methods and systems for automatically presenting a hierarchical graphical representation of the structure of the computer network are provided. A computer-implemented method includes obtaining network topology data, determining at least one core node at a highest level in a hierarchy from a plurality of nodes based on the network topology data, grouping at least a part of non-core nodes among the nodes into one or more supernodes based on the obtained network topology data, selecting, with respect each of the one or more supernodes, a single supernode or node at a hierarchical level immediately higher than thereof, as a parent node, determining a spatial coordinate of each of the plurality of nodes based on the at least one core node, the one or more supernodes, and the parent node of each of the one or more supernodes, and presenting the hierarchical graphical representation.

14 Claims, 9 Drawing Sheets

(56) References Cited

U.S. PATENT DOCUMENTS

| | | | | |
|---|---|---|---|---|
| 2006/0288311 | A1* | 12/2006 | Heer | G06T 11/206 715/853 |
| 2009/0083390 | A1* | 3/2009 | Abu-Ghazaleh | H04L 41/12 709/209 |
| 2009/0171969 | A1* | 7/2009 | Ristock | G06Q 10/107 |
| 2012/0143849 | A1* | 6/2012 | Wong | G06F 16/2393 707/722 |
| 2013/0036289 | A1* | 2/2013 | Welnicki | G06F 3/0641 711/173 |
| 2014/0122741 | A1* | 5/2014 | Thubert | H04L 45/04 709/239 |
| 2015/0023206 | A1* | 1/2015 | Le Merrer | H04L 41/12 370/254 |
| 2015/0278273 | A1* | 10/2015 | Wigington | G06F 16/185 707/797 |
| 2016/0034313 | A1* | 2/2016 | Chen | G06F 9/461 718/104 |
| 2016/0034478 | A1* | 2/2016 | Hernandez-Sherrington | G06F 16/2228 707/694 |
| 2016/0087849 | A1* | 3/2016 | Balasubramanian | H04L 41/12 709/221 |
| 2016/0212163 | A1* | 7/2016 | Louni | G06F 16/9024 |
| 2016/0239276 | A1* | 8/2016 | Maclean | G06F 8/433 |
| 2017/0221240 | A1* | 8/2017 | Stetson | G06T 11/206 |
| 2017/0286835 | A1* | 10/2017 | Ho | G06F 16/367 |
| 2017/0351703 | A1* | 12/2017 | Shreyas | H04L 67/06 |
| 2018/0018709 | A1* | 1/2018 | Sela | G06Q 30/0271 |
| 2018/0191590 | A1* | 7/2018 | Westphal | H04L 43/0811 |
| 2018/0302288 | A1* | 10/2018 | Schmatz | H04L 41/12 |
| 2018/0357262 | A1* | 12/2018 | He | G06F 16/2282 |
| 2019/0327602 | A1* | 10/2019 | Thanneeru | H04W 24/04 |
| 2020/0042639 | A1* | 2/2020 | Mathison | G06F 16/93 |
| 2020/0104425 | A1* | 4/2020 | Shin | G06F 16/951 |
| 2020/0412763 | A1* | 12/2020 | Mercian | H04L 41/12 |

OTHER PUBLICATIONS

5 Ways to Build a Dynamic Map, NetBrain, (2020), https://www.netbraintech.com/blog/five-ways-build-dynamic-map/.

* cited by examiner

US 11,658,882 B1

ALGORITHM-BASED AUTOMATIC PRESENTATION OF A HIERARCHICAL GRAPHICAL REPRESENTATION OF A COMPUTER NETWORK STRUCTURE

BACKGROUND

A topology of a computer network is highly complicated. Even in a small local area network, there are many nodes, including one or more routers, switches, firewalls, administration terminals, terminals for troubleshooting, member terminals, guest user terminals, and datacenters to name a few. It would be preferable for those who manage and maintain the infrastructure of such a computer network to easily grasp the structure thereof using some graphical representations of the structure. The most traditional method of producing such graphical representations would be the manual method. However, when the number of nodes in the computer network is quite large, it is practically impossible for a human user to understand the network structure and create the graphical representation. There are conventional software products that provide graphical representations of a computer network structure; however, such conventional software products require user interaction to produce the graphical representation, or produce only a summary or a small portion of an entire computer network. Therefore, it is desirable to automatically produce a graphical representation of a computer network structure based on a pre-fixed algorithm without substantial user involvement.

SUMMARY

Various embodiments of the present disclosure provide methods, systems, and non-transitory computer readable media for automatically presenting a hierarchical graphical representation of a structure of a computer network. In some embodiments, a computer-implemented method includes obtaining network topology data, determining a spatial coordinate of each of the plurality of nodes constituting the computer network based on analysis of the obtained network topology data, and presenting the hierarchical graphical representation of the structure of the computer network, in which each of the plurality of nodes is located at the determined spatial coordinate thereof.

In some embodiments, the network topology data includes, with respect to each of a plurality of nodes constituting the computer network, an identifier of the node and an identifier of one or more nodes that are directly connected to the node. In some embodiments, the analysis of the obtained network topology data includes determining at least one core node at a highest level in a hierarchy from the plurality of nodes based on the obtained network topology data, grouping at least a part of non-core nodes among the plurality of nodes into one or more supernodes based on the obtained network topology data, each of the one or more supernodes including two or more nodes, and selecting, with respect each of the one or more supernodes, a single supernode or node that is connected thereto and at a hierarchical level immediately higher than thereof, as a parent node thereof. In some embodiments, the spatial coordinate of each of the plurality of nodes is determined based on the at least one core node, the one or more supernodes, and the parent node of each of the one or more supernodes.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, methods, systems, and non-transitory computer readable media for automatically presenting a hierarchical graphical representation of a structure of a computer network are provided. According to the methods, systems, and non-transitory computer readable media for automatically presenting the hierarchical graphical representation of the structure of the computer network, the hierarchical graphical representation can be generated at an extremely high speed (e.g., less than a minute), while reflecting the major connection relationships among the nodes of the computer network, as opposed to a summary or a portion of the computer network.

Figure 1:
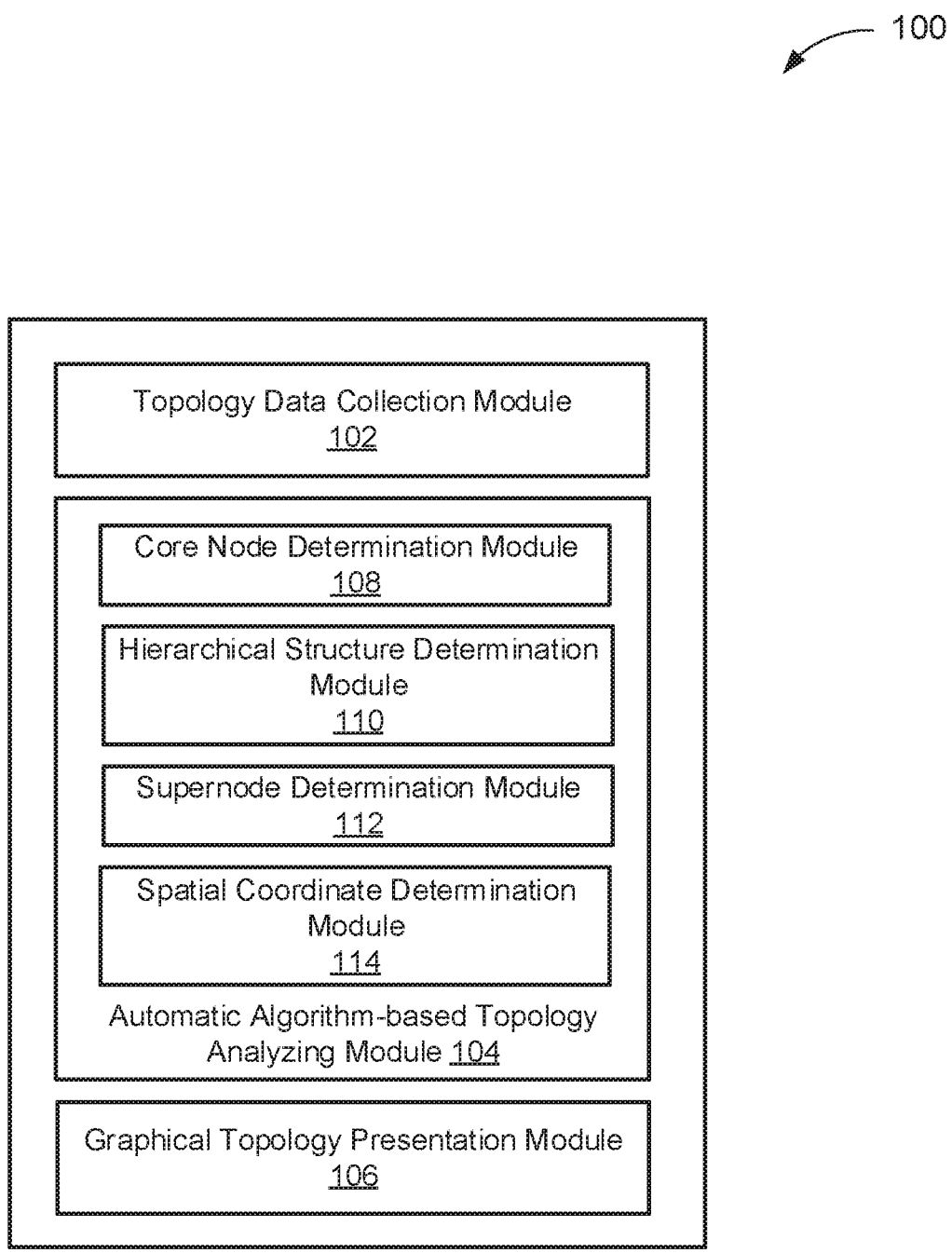
FIG. 1 illustrates an example of a hierarchical graphical representation system for automatically presenting a hierarchical graphical representation of a structure of a computer network according to some embodiments.

In this disclosure, "automatically" refers to a functionality of the methods, systems, and non-transitory computer readable media configured to generate the hierarchical representation without substantial user interaction while the program is being executed. "Hierarchical" refers to a concept that a plurality of nodes constituting the computer network is categorized into multiple hierarchical levels and the nodes are visually represented in accordance with the hierarchical levels thereof. "Node," in an embodiment, refers to a computing device constituting the computer network and has a unique identifier (e.g., MAC address, IP address, an arbitrary identifier assigned by the system, etc.) to identify the computing device. The computing device may include both a physical computing device and a virtual machine (VM) emulated in a physical computing device. The computing device may include an end-user terminal, a server, a firewall, a router, and/or a switch. "Node," in another embodiment, may refer to a computer element, such as an application (e.g., an end-user application, a web service, etc.), process, container, instance, or another program that is configured to be executed in a computing device. In various embodiments, a "connection", "link", or "edge" between nodes may likewise refer to a physical cable between nodes, a virtual communication channel, a transport-layer or application-layer connection, or other means of communication between nodes. Therefore, according to the present disclosure, a graphical representation of application-level topology, including multiple processes as nodes, may be generated. "Graphical representation" refers to a visually-perceivable object in a spatial domain. Typically, the graphical representation may be two-dimensional (2D); however, it may be three-dimensional (3D). The graphical representation may also extend to a time domain, that is, the visually-perceivable object in the spatial domain may vary in accordance with time. "Computer network" may typically refer to a portion and/or an entirety of a network, such as a private network dedicated for a particular entity (e.g., enterprise, government, etc.). FIG. 1 illustrates an example of a hierarchical graphical representation system 100 for automatically presenting a hierarchical graphical representation of a structure of a computer network according to some embodiments. In the example shown in FIG. 1, the hierarchical graphical representation system 100 includes a topology data collection module 102, an automatic algorithm-based topology analyzing module 104, and a graphical topology presentation module 106.

The hierarchical graphical representation system 100 is a computing system configured to automatically generate a hierarchical graphical representation of a structure of a computer network in accordance with a pre-fixed program based on an algorithm, and operates to visually present the generated hierarchical graphical representation on a device such as a display device. The computing system may be configured as hardware, software, or a combination of both.

The topology data collection module 102 is a computing module configured to obtaining network topology data. "Module" used here and in the following may refer to hardware, software, or a combination thereof. The network topology data is data indicating a structural feature of the computer network. In an embodiment, the network topology data includes, with respect to each of the plurality of nodes constituting the computer network, an identifier of the node and an identifier of one or more nodes that are directly connected to the node. In an embodiment, the network topology data may further include, for at least some of the plurality of nodes, geographical data that indicates a geographical location at which the node is located. The geographical location may be by any applicable geographical levels, such as country, time zone, states, county, city, and so on.

In some embodiments, the topology data collection module 102 obtains the network topology data from each of the nodes constituting the computer network. For example, the topology data collection module 102 obtains the network topology data by requesting each of the nodes for a network topology data portion possessed by the node. Depending on a specific implementation of the embodiments, an instant packet communication may be carried out with each of the nodes constituting the network to obtain the network topology data. In some embodiments, the topology data collection module 102 obtains the network topology data from a part of the nodes that have already accumulated the relevant data to be used as the network topology data. For example, a part of the nodes comprising the computer network, such as a router, a switch, and a firewall, may have accumulated information about nodes connected thereto through previous data communication with them. As another example, a server or collection of servers used in a network monitoring system may have collected and stored relevant data. In such a case, the topology data collection module 102 may not need to access each of the nodes constituting the computer network. In some embodiments, the topology data collection module 102 may receive user inputs including at least a portion of the network topology data.

The automatic algorithm-based topology analyzing module 104 is a computing module configured to analyze the network topology data to generate the hierarchical graphical representation of the structure of the computer network. The automatic algorithm-based topology analyzing module 104 includes a core node determination module 108, a hierarchical structure determination module 110, a supernode determination module 112, and a spatial coordinate determination module 114.

The core node determination module 108 is a computing module configured to determine one or more core nodes among the plurality of nodes constituting the computer network based on the network topology data obtained by the topology data collection module 102. A core node refers to a node that is categorized at the highest hierarchical level of the hierarchy. Depending on the specific structure of the computer network, the number of core nodes may be one, or two or more. For example, in a real enterprise computer network, the core node determined by the core node determination module 108 may include a node that connects different nodes in a wide-area network and/or a gateway router that connects different nodes in a single data center.

In some embodiments, the core node determination module 108 determines one or more core nodes based on a name associated with each of the nodes determined to be core nodes. For example, the core node determination module 108 may determine a node having a predetermined key string (e.g., WAN) in the name that the administrator of the node has assigned to it. Depending on a specific implementation of the embodiments, the predetermined key string may be determined by a user in advance and/or may be predetermined through a machine learning algorithm (e.g., supervised machine learning) based on a set of examples of nodes preferred by users to be determined to be core nodes.

In some embodiments, the core node determination module 108 determines one or more core nodes based on a network structure obtained by analyzing the network topology data. More specifically, a node that forms connectivity among many other nodes in the computer network may be identified from the network structure, that is, forms a most "well-connected" portion of the network structure, may be determined to be a core node.

To achieve this, an algorithm based on betweenness centrality may be employed. In some embodiments, according to an algorithm based on betweenness centrality, a centrality value is assigned to each of the nodes constituting the computer network. In a specific implementation, the centrality value of an individual node may be computed based on the number of shortest paths between any pair of nodes in the network which pass through that individual node. This computation may take a significant amount of time as the number of nodes in the computer network is quite large (e.g., 1000 or even 10,000 or larger). In such a case, the centrality value of a node may be computed approximately based on shortest paths from randomly-picked sample nodes (e.g., 100 nodes) among all nodes.

After computing the centrality value (or the approximate centrality value) for each of the nodes, the core node determination module 108 determines one or more nodes whose centrality value satisfies a predetermined criteria to be the core node. For example, the core node determination module 108 may determine one or more nodes having the highest centrality value to be the core nodes. In another example, the core node determination module 108 may determine a predetermined number of nodes in a decremental order of the centrality value to be the core nodes. In another example, the core node determination module 108 may determine a predetermined percentage of nodes in a decremental order of the centrality value to be the core nodes.

In some embodiments, the core node determination module 108 determines one or more core nodes based on attribute data of nodes that may be included in the network topology data. For example, when the attribute data include a geographical location of at least a part of the plurality of nodes, the core node determination module 108 may determine one or more nodes located at a specific geographical location to be the core nodes. In another example, when the attribute data include a privilege status (e.g., administrator, member user, guest user, etc.) of at least a part of the plurality of nodes, the core node determination module 108 may determine nodes of a certain privilege status to be the core nodes. In another example, when the attribute data include a connectivity feature of nodes, the connectivity feature may be used to determine the core nodes. The connectivity feature may include direct connectivity to Internet providers, a function of running routing protocols (e.g., BGP) as opposed to layer-2 switches, long physical distance connection to other nodes, high link speeds, to name a few. Depending on a specific implementation of the embodiments, the attribute data matching the feature of the core node may be determined by a user in advance and/or may be predetermined through a machine learning (e.g., supervised machine learning) based on typical characteristics of the nodes that are determined to be the core nodes and their attribute data.

In some embodiments, the core node determination module 108 may use user inputs designating an identifier of each of one or more core nodes as training data and a modification of the algorithm to determine core nodes through a supervised machine learning process. For example, the core node determination module 108 may compare one or more core nodes that are determined through running the algorithm with one or more core nodes that are designated by users, and modify the algorithm based on the result of comparison through the machine learning process.

The hierarchical structure determination module 110 is a computing module configured to determine a hierarchical level of the nodes constituting the computer network. In a specific implementation, the hierarchical structure determination module 110 first determines one or more core nodes determined by the core node determination module 108 to be at the highest hierarchical level. Then, the hierarchical structure determination module 110 determines a hierarchical level of each of non-core nodes.

To achieve this, the hierarchical structure determination module 110 may set a cost of each link connecting two nodes to be one, and then calculate a total minimum cost for communication between a non-core node to a closest core node thereto for each of non-core nodes, by running a program based on a shortest path algorithm. The highest hierarchical levels of the non-core nodes are determined in the ascending order of the total minimum cost to the core node. For example, when the total minimum cost of communication from a non-core node to the core node is one, that is, directly connected to the core node, the hierarchical structure determination module 110 may determine the non-core node to be a child node of the core node, i.e., a node at a hierarchical level immediately lower than the hierarchical level of the core node. When the total minimum cost of communication from a non-core node to the core node is two, the hierarchical structure determination module 110 may determine the non-core node to be a grandchild node of the core node, i.e., a node at a hierarchical level immediately lower than that of the child nodes.

The supernode determination module 112 is a computing module configured to group at least a part of the plurality of nodes constituting the computer network into one or more supernodes based on the obtained network topology data and the determined hierarchical levels of the nodes. In a specific implementation, when there are multiple core nodes, the supernode determination module 112 groups the multiple core nodes into a single core-supernode. That is, the single core-supernode includes the multiple core nodes, and is at the highest hierarchical level.

The supernode determination module 112 also groups non-core nodes into one or more supernodes. In a specific implementation, the supernode determination module 112 may group into a single supernode two or more non-core nodes that are at the same hierarchical level and satisfy a predetermined condition evaluating these nodes' (1) connectivity among each other or (2) similarity of their connectivity to other nodes. For example, the predetermined connectivity condition may be two conditions: (1) at least 50% of children of a first non-core node are also children of a second non-core nodes; and (2) at least 50% of children of the second non-core node are also children of the first non-core nodes. In another specific implementation, the supernode determination module 112 may group two or more non-core nodes that have no children (hereinafter referred to as a "leaf node") into a single non-core supernodes. For example, the supernode determination module 112 may group leaf nodes that are connected to the same set of neighboring nodes or supernode at their immediately higher hierarchical level into a single leaf-supernode.

In some embodiments, the supernode determination module 112 may determine the grouping into supernodes, primarily or in addition to the hierarchical levels, based on attribute data of nodes that may be included in the network topology data. For example, geographical regions, sites, datacenter in which the nodes are located, etc. may be considered with different weights, respectively.

Depending on a specific structure of the computer network, there may be single or multiple supernodes at each of multiple hierarchical levels. Also, depending on a specific structure of the computer network, there may be one or more independent nodes that are not grouped into any supernode. Although the present disclosure discusses primarily on supernodes including multiple nodes therein, independent nodes can be treated in the same manner as the supernodes.

After the supernode determination module 112 groups non-core nodes into one or more non-core supernodes, the hierarchical structure determination module 110 selects, with respect each of the one or more non-core supernodes, a single supernode or node that is connected thereto and at a hierarchical level immediately higher than thereof, as a parent node thereof. Depending on a specific structure of the computer network, there may be only one supernode (or independent node) at a hierarchical level immediately higher than that of a non-core supernode. In such a case, the only one supernode (or independent node) is determined to be the parent node. As a result of these selection steps, a core node (or a core-supernode) is selected as a parent node of at least one of the non-core supernodes, if there exists at least one non-core supernode directly or indirectly connected to the core node or core supernode.

Depending on a specific structure of the computer network, there may be multiple supernodes (or independent nodes) at a hierarchical level immediately higher than that of a non-core supernode. In such a case, the supernode determination module 112 may select one of these higher-level supernodes as a parent node. Any applicable algorithm to select a suitable parent node that has the most connectivity to the supernode may be employed. For example, the number of links from each of nodes in a supernode to nodes in its higher-level supernodes are calculated with respect to each of the higher-level supernodes, and one of the higher-level supernodes with the greatest number of links may be selected as the parent node.

The spatial coordinate determination module 114 is a computing module configured to determine a spatial coordinate of each of the plurality of nodes based on the determined at least one core node, the one or more supernodes, and the parent node of each of the one or more supernodes. The spatial coordinate may depend on a layout structure of the hierarchical graphical representation. For example, the spatial coordinate for a top-down layout structure (see FIGS. 6 and 7) may be different from the spatial coordinate for a center-out layout structure (see FIG. 8). The spatial coordinate may be either a 2D or 3D coordinate, and may be represented in any applicable coordinate systems such as a Cartesian coordinate system and a polar coordinate system.

In some embodiments, when the hierarchical graphical representation is presented in a top-down layout structure (e.g., the hierarchical graphical representation system 100 is in a top-down layout mode), the spatial coordinate determination module 114 carries out a top-down layout spatial coordinate determination process. The spatial coordinate determination module 114 carries out the top-down layout spatial coordinate determination process, such that core nodes are arranged at a top along a horizontal line, child nodes of the core nodes are arranged below the core nodes along a horizontal line, and their descendant nodes are arranged horizontally in a descending order of the hierarchical levels. In a specific implementation, the leaf nodes may be arranged in a box shape (or may be referred to as a matrix shape), instead of in a horizontal line, depending on the number of leaf nodes. More detail of the top-down layout spatial coordinate determination process is described below with reference to FIG. 4.

In some embodiments, when the hierarchical graphical representation is presented in a center-out layout structure (e.g., the hierarchical graphical representation system 100 is in a center-out layout mode), the spatial coordinate determination module 114 carries out a center-out layout spatial coordinate determination process. The spatial coordinate determination module 114 carries out the center-out layout spatial coordinate determination process, such that one or more core nodes are located at a center and non-core nodes are radially located around the one or more core nodes. A distance from the core nodes may approximately correspond to the hierarchical level of the non-core nodes, and the farther the distance the lower the hierarchical levels may be. A more detail of the center-out layout spatial coordinate determination process is described below with reference to FIG. 5.

The graphical topology presentation module 106 is a computing module configured to generate and present the hierarchical graphical representation according to the determined spatial coordinate of the nodes constituting the computer network. In a specific implementation, the graphical topology presentation module 106 may operate to generate image data of the hierarchical graphical representation and transmit the generated image data to an applicable display device, such that the display device can display the hierarchical graphical representation based on the image data.

The hierarchical graphical representation includes each of the nodes constituting the computer network at the determined spatial coordinate thereof. The hierarchical graphical representation also includes an edge representing a connection between two nodes that are directly connected to each other. In a specific implementation, the edge is represented by a straight line and/or curved line. In some embodiments, the graphical topology presentation module 106 operates to remove some of the edges connecting a node to another node in a non-parent supernode that is at an immediately higher hierarchical level, or to represent these edges in a summarized form such as showing only a single link between two supernodes that have multiple links between their constituent nodes. This removal of some edges may cause the hierarchical graphical representation to not accurately represent the actual structure of the computer network, or to present it in reduced detail, but may make the hierarchical graphical representation to be more intuitively understandable by the user. In some embodiments, the graphical topology presentation module 106 may optionally utilize the groupings of nodes which were used to determine the hierarchical graphical representation, such as (1) the nodes forming one or more supernodes or (2) the nodes which are descendants of a node or supernode. For example, the graphical topology presentation module 106 may display these groupings, allow the user to search for them, allow the user to assign names to them, or provide a mechanism to store these groupings in order to utilize them in external systems.

Figure 2:
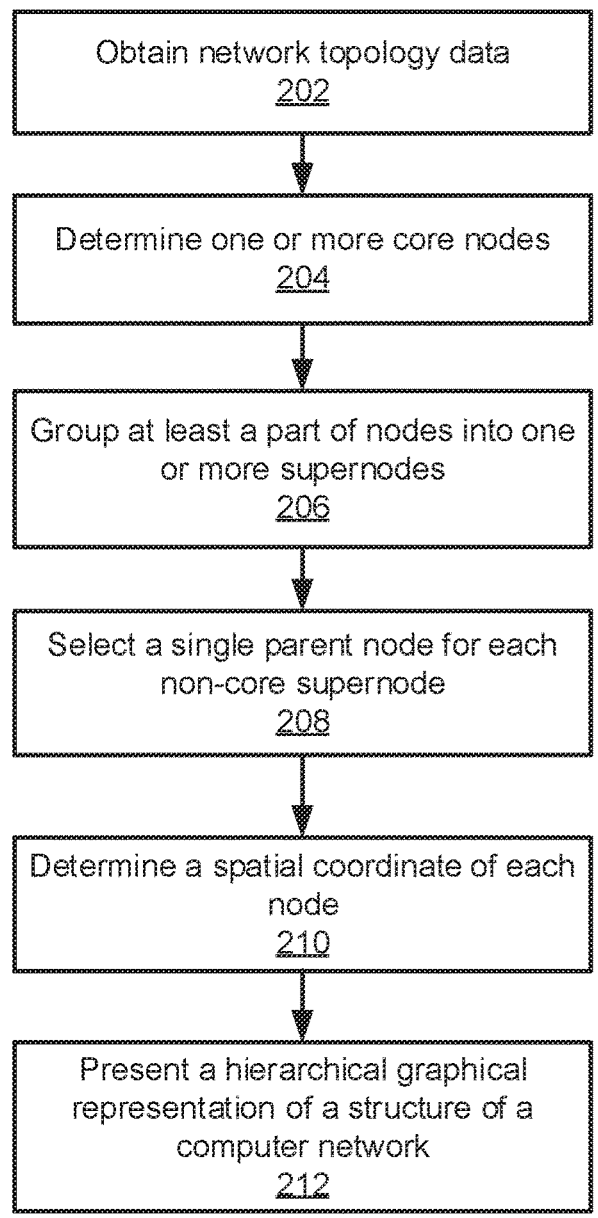
FIG. 2 is a flowchart of an example of a computer-implemented method for presenting a hierarchical graphical representation of a structure of a computer network according to some embodiments.

FIG. 2 is a flowchart 200 of an example of a computer-implemented method for automatically presenting a hierarchical graphical representation of a structure of a computer network according to some embodiments. This flowchart and the subsequent flowchart described in the present disclosure illustrate steps organized in a fashion that is conducive to understanding. It should be recognized, however, that the steps can be reorganized for parallel execution, reordered, modified (changed, removed, or augmented), where circumstances permit. In some embodiments, the steps shown in the flowchart 200 are primarily carried out by the modules 102-114 included in the hierarchical graphical representation system 100 illustrated in FIG. 1.

In step 202, network topology data is obtained. In some embodiments, the network topology data include, with respect to each of a plurality of nodes constituting a computer network, an identifier of the node and an identifier of one or more nodes that are directly connected to the node.

The applicable source may be each of the plurality of nodes constituting the computer network, in which case the topology data collection module operates to send a request for the identifier of a node and an identifier of one or more directly-connected nodes thereof to each of the plurality of nodes. In some embodiments, a topology data collection module, such as the topology data collection module 102 in FIG. 1, operates to obtain the network topology data from an applicable source.

In step 204, one or more core nodes are determined among the plurality of node constituting the computer network. The one or more core nodes are nodes at a highest level in an hierarchy of the computer network. The determination of the core node is carried out based on the network topology data obtained in step 202. More specifically, a predetermined key string included in an identifier of each node and/or a geographical location of each node that can be included in the network topology data may be employed to determine the core node. In addition or in the alternative, an applicable betweenness centrality algorithm may be employed to determine the core node. In some embodiments, a core node determination module, such as the core node determination module 104 in FIG. 1, operates to determine the one or more core nodes.

In step 206, at least a part of the plurality of nodes constituting the computer network is grouped into one or more supernodes. In some embodiments, the grouping into the one or more supernodes are carried out based on the network topology data obtained in step 202. More detailed step of determining the supernodes is discussed below with reference to FIG. 3. In some embodiments, a hierarchical structure determination module, such as the hierarchical structure determination module 110 in FIG. 1 and a supernode determination module, such as the supernode determination module 112 in FIG. 1, cooperatively operate to determine the supernodes.

In step 208, a single parent node is selected for each of the one or more supernodes determined in step 206. Depending on the specific structure of the computer network, the parent node may be a supernode (or an independent node). When there are multiple nodes (e.g., supernodes and/or independent nodes) at an immediately higher hierarchical level of a supernode, a single node (either supernode or independent node) that demonstrates the most connectivity with the supernode is selected among those at the immediately higher hierarchical level. In some embodiments, a hierarchical structure determination module, such as the hierarchical structure determination module 110 in FIG. 1, operates to determine the single parent node.

In step 210, a spatial coordinate of each of the plurality of nodes constituting the computer network is determined. In some embodiments, the spatial coordinate of each of supernodes and nodes therein is determined such that cross points of edges, which represent direct connection among the nodes, are minimized in the hierarchical graphical representation. Depending on the layout structure of the hierarchical graphical representation, different algorithms to determine the spatial coordinate may be employed. For example, when the layout structure of the hierarchical graphical representation is a top-down layout structure (see, e.g., FIGS. 6 and 7), an algorithm configured to arrange nodes at a same hierarchical level in a same horizontal position may be employed. An example of a more detailed configuration of such an algorithm is described below with reference to FIG. 5. For example, when the layout structure of the hierarchical graphical representation is a top-down layout structure (see, e.g., FIG. 8), an algorithm configured to radially arrange non-core nodes around one or more core nodes located at a center may be employed. An example of a more detailed configuration of such an algorithm is described below with reference to FIG. 6. Any applicable layout structures other than the top-down layout structure and the center-out layout structure may be employed. In some embodiments, a spatial coordinate determination module, such as the spatial coordinate determination module 114 in FIG. 1, operates to determine the spatial coordinate of nodes constituting the computer network.

In step 212, a hierarchical graphical representation of a structure of the computer network is presented, by locating each the nodes constituting the computer network at its spatial coordinate determined in step 210. In a specific embodiment, each node may be represented by a dot, and an edge representing a direct connection between two nodes may be represented by a line, more particularly a straight line or a curved line. Depending on a specific implementation of the embodiments, any applicable image element may be used to represent the nodes and edges. In some embodiments, a graphical topology presentation module, such as the graphical topology presentation module 106 in FIG. 1, operates to present the hierarchical graphical representation of the structure of the computer network.

Depending on a specific structure of the computer network, there may be multiple cluster of nodes that have no connection (even non-direct connection) with each other. In such a case, the above steps 202-210 are carried out with respect each cluster. Further, in step 210 the spatial coordinates of the nodes in different clusters are determined such that the coordinates of the nodes in different clusters do not overlap each other.

In some embodiments, a variation of the hierarchical graphical representation over time may be presented. In such a case the above steps 202-212 are carried out repeatedly over time. In some embodiments, a new hierarchical graphical representation may be reproduced by repeating at least some of the above steps 202-212, when additional nodes are added to the computer network after a hierarchical graphical representation of the computer network has been generated. In such a case, in a specific implementation, an additional step of determining whether or not the additional nodes can fit in the existing supernodes and an additional step of creating new supernodes if the additional nodes do not fit to any existing supernodes. In another specific implementation, the core node may be modified to another node(s) and/or the hierarchical levels of the nodes may be modified to new levels as a result of the addition of new nodes.

Figure 3:
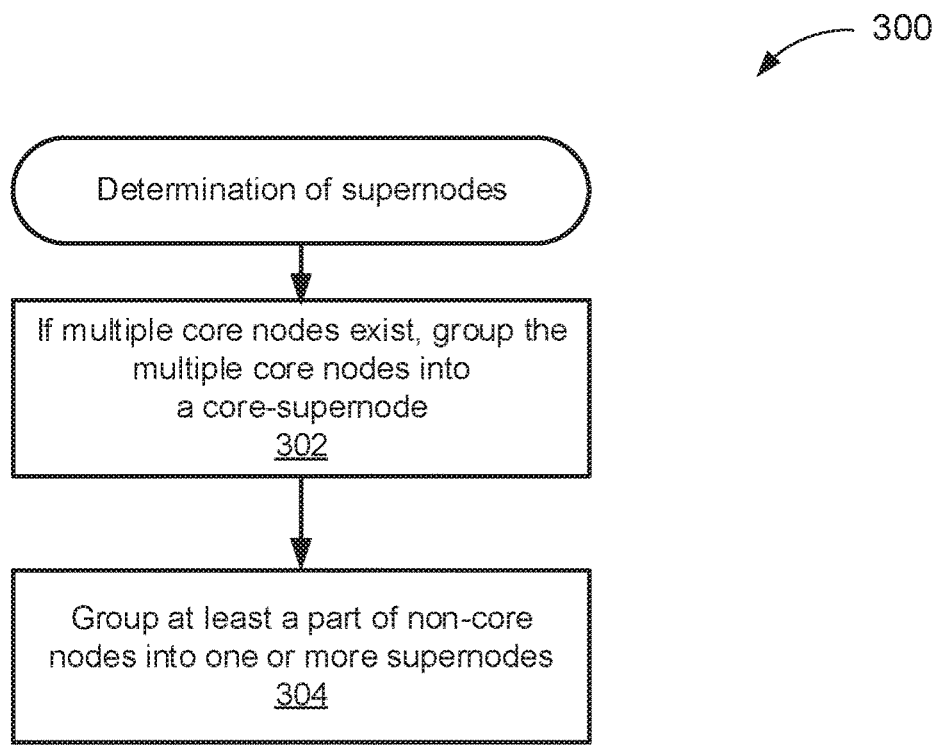
FIG. 3 is a flowchart of an example of a computer-implemented method for determining supernodes among a plurality of nodes constituting a computer network according to some embodiments.

FIG. 3 is a flowchart 300 of an example of a computer-implemented method for determining supernodes among a plurality of nodes constituting a computer network according to some embodiments. In some embodiments, the steps shown in the flowchart 300 are primarily carried out by the hierarchical structure determination module 110 and the supernode determination module 112 illustrated in FIG. 3.

In step 302, whether or not there are multiple core nodes exist is determined, and the multiple core nodes, if determined to exist, are grouped into a single core-supernode. The single core-supernode is at the highest hierarchical level of the hierarchy in the computer network, and non-core nodes are at hierarchical level(s) lower than that of the core-supernode. When there is a single core node, the determination of the core-supernode may not be carried out.

In step 304, at least a part of non-core nodes among nodes constituting the computer network is grouped into one or more supernodes. In some embodiments, in order to group into supernodes, first a hierarchical level of each of the non-core nodes may be determined based on a depth from the core node (or core-supernode). Also, a connectivity of each non-core node with the other non-core node(s) may be determined based on the topology of the computer network, which may be obtained from network topology data. The grouping into a supernode may be carried out based on the determined hierarchical level and the determined connectivity of each non-core node. For example, non-core nodes at the same hierarchical level and have a similar connectivity may be grouped into a supernode. The similar connectivity may, for example, include a situation where the non-core nodes share the same core node among a core-supernode, share similar or same ascendant or descendant nodes, and/or are directedly connected to each other. In some embodiments, the grouping into supernodes are carried out at each hierarchical level in a descending order of the hierarchy, i.e., from the higher level to the lower level, iteratively.

Figure 4:
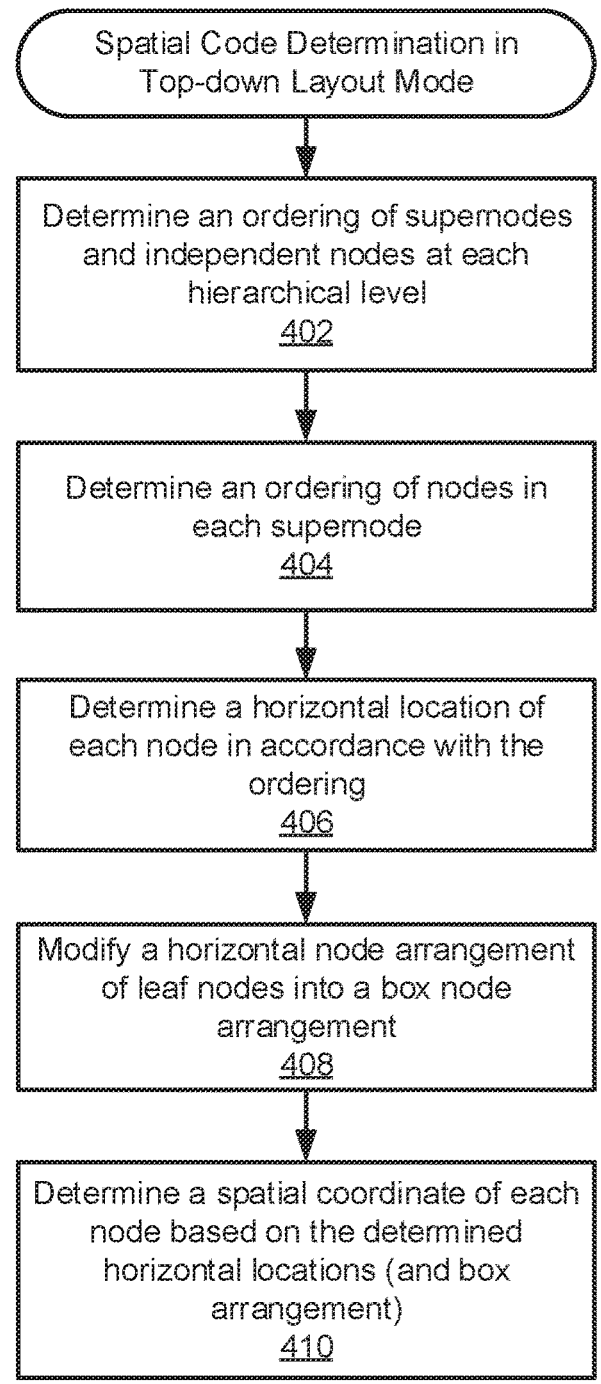
FIG. 4 is a flowchart of an example of a computer-implemented method for determining a spatial coordinate of each of a plurality of nodes constituting a computer network for presentation in a top-down layout structure according to some embodiments.

FIG. 4 is a flowchart 400 of an example of a computer-implemented method for determining a spatial coordinate of each of a plurality of nodes constituting a computer network for presentation in a top-down layout structure according to some embodiments. In some embodiments, the steps shown in the flowchart 400 are primarily carried out by the spatial coordinate determination module 114 illustrated in FIG. 1.

In step 402, an ordering of supernodes and independent nodes is determined at each hierarchical level. For example, when there are three core nodes in a core-supernode, an arrangement order of the three core nodes is determined. In another example, when there are two supernodes and three independent nodes at a certain hierarchical level, an arrangement order of the five nodes (i.e., the two supernodes and the three independent nodes) is determined. In some embodiments, the ordering is carried out such that more closely connected nodes (supernodes and/or independent nodes) are ordered closer to each other.

In a specific implementation, the ordering at each hierarchical level may be carried out in accordance with an ordering algorithm. An ordering algorithm may initially assign an arbitrary among supernodes and independent nodes in a particular hierarchical level. For example, if there are 50 nodes at a particular hierarchical level, the 50 nodes are each assigned a unique integer from a set of {1, 2, . . . , 50}. Then, an average neighboring position, which is an average ordering value of all neighboring nodes, is calculated for each supernode (and each independent node). The nodes are then reordered in the order of the calculated average neighboring position. In a specific implementation, this ordering algorithm may be executed in the hierarchical order, from the higher level to the lower level, to obtain the ordering of the supernodes and independent nodes; and may be repeated multiple times to improve orderings.

In step 404, an ordering of nodes in each supernode is determined. Depending on the specific implementation of the embodiments, the same or similar algorithm to determine the ordering in each hierarchical level may be employed to determine the ordering of nodes within each supernode. In some embodiments, the ordering algorithm employed in step 402 may be employed in step 404. In some embodiments, the ordering at each hierarchical level carried out in step 402 and the ordering in each supernode in step 404 may be carried out altogether employing a single algorithm.

In step 406, a horizontal location of each node in a horizontal arrangement is determined in accordance with the ordering at each hierarchical level and the ordering in each supernode. For example, with respect to core nodes, the core nodes are located at a top position in a vertical direction and arranged in a horizontal direction in accordance with the determined order. For example, with respect to supernodes and independent nodes at an immediately lower level of the core nodes (i.e., children of the core nodes), these nodes are located at a lower position in the vertical direction than the top position and arranged in the horizontal direction in accordance with the determined order.

In step 408, a horizontal node arrangement of leaf nodes in one or more supernodes is modified into a box node arrangement. Depending on a specific implementation of the embodiments, this conversion to the box arrangement may be applied to only a part of supernodes at the lowest hierarchical level, or to all of the supernodes at the lowest hierarchical level. Depending on a specific user preference that is set in advance of running the algorithm to determine the spatial coordinate by the method 400, the step 408 may or may not be carried out. In some embodiments, a compactness metric may be calculated for the horizontal arrangement of the nodes in a leaf-supernode and for the box arrangement of the nodes, and one of the horizontal arrangement and the box arrangement that indicates a more compact representation of the leaf nodes may be employed to show the leaf nodes in the hierarchical graphical representation. In some embodiments, a leaf supernode may be arranged in a box when all of its constituent nodes are connected to the same set of nodes; hence, distinguishing their individual connectivity is less important and a more compact arrangement may be preferred.

In step 410, a spatial coordinate of each node is determined based on the determined horizontal locations (and box arrangement for the leaf nodes). In some embodiments, the spatial coordinate of each node is determined by rotating, scaling, or flipping the entire hierarchical graphical representation, such that the nodes constituting the computer network fits in a certain frame size.

Figure 5:
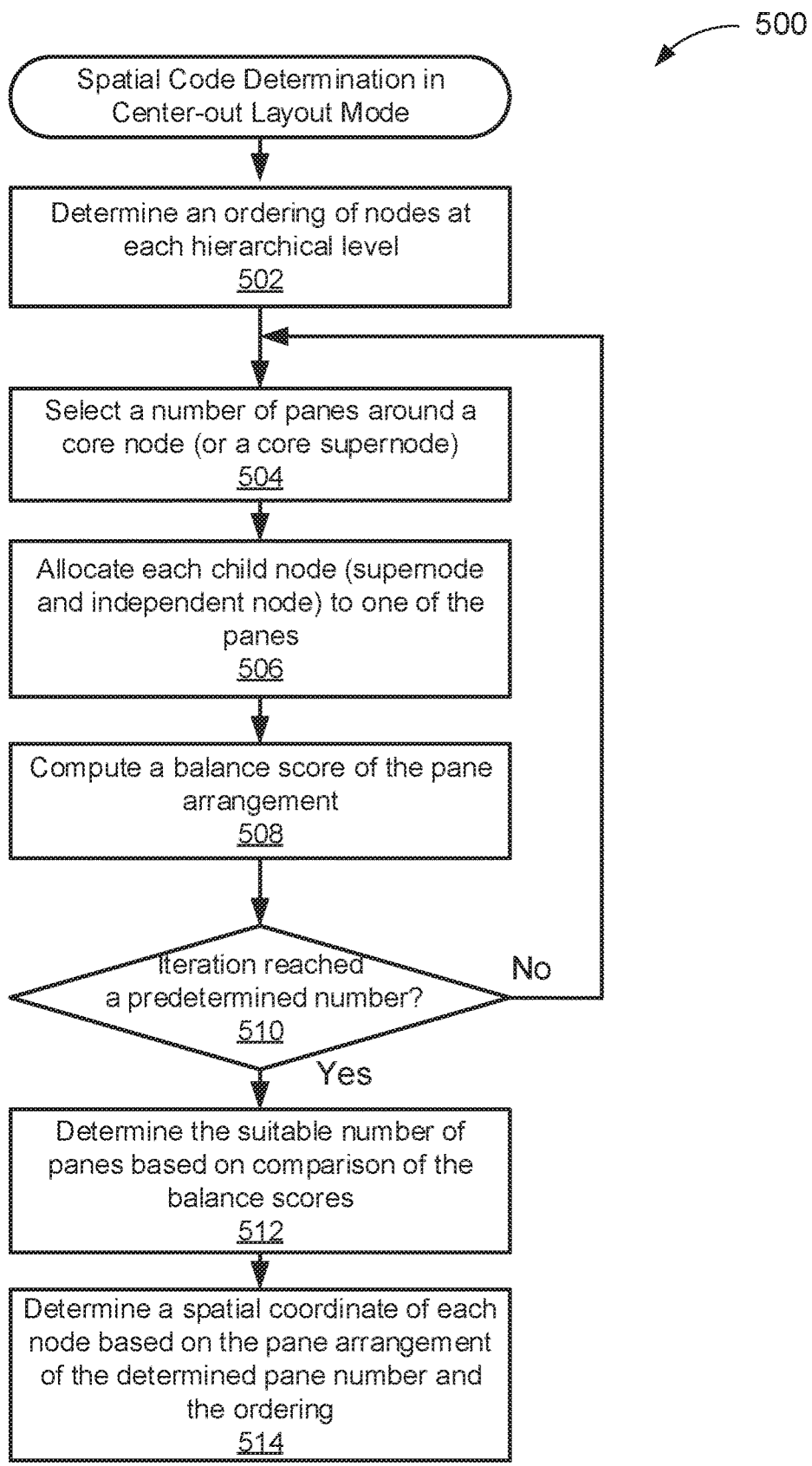
FIG. 5 is a flowchart of an example of a computer-implemented method for determining a spatial coordinate of each of a plurality of nodes constituting a computer network for presentation in a center-out layout structure according to some embodiments.

FIG. 5 is a flowchart 500 of an example of a computer-implemented method for determining a spatial coordinate of each of a plurality of nodes constituting a computer network for presentation in a center-out layout structure according to some embodiments. In some embodiments, the steps shown in the flowchart 500 are primarily carried out by the spatial coordinate determination module 114 illustrated in FIG. 1.

In step 502, an ordering of nodes at each hierarchical level is determined. In some embodiments, the ordering may be carried out in the same or similar manner as the step 402 in FIG. 4 carried out to represent the hierarchical graphical representation in a top-down layout structure.

In step 504, a number of panes around a core node (or a core supernode) is selected from a predetermined list of the pane number (e.g., 1, 2, and 4). Depending on the specific implementation of the embodiments, there may be a fixed selection order, or the order of selecting the number of panes may be varied.

In step 506, each child node (supernode and independent node) of the core node(s) is allocated to one of the panes of the determined number. In a specific implementation, one of the pane(s) of the determined number is selected first, and some of child nodes of the core node(s) are allocated to the pane in accordance with the determined ordering in step 502 until a specific condition (e.g., a total width of the child nodes exceeds a threshold) is satisfied, and then the some of the remaining child nodes are allocated to the next pane until the specific condition is satisfied. It is hear noted that child nodes in the same supernode are allocated to the same pane, and all descendant nodes of the child nodes in the same supernodes are also allocated to the same pane. Such a process is carried out until all child nodes of the core node(s) are allocated.

In step 508, a balance score of the pane arrangement of the pane number is computed. In some embodiments, the balance score may be computed based on a total number of nodes in each pane, a total width of nodes in each hierarchical level in each pane, and/or a number of hierarchical levels of the nodes allocated in each pane, and so on.

In step 510, whether or not a number of iteration reached a predetermined number is determined. When the number of iteration has not reached the predetermined number, the process returns to step 504, and a number of panes that has not been selected is selected in step 504, and the same process of steps 506-508 are carried out. When the number of iteration reached the predetermined number, the process proceeds to step 512.

In step 512, the suitable number of panes is determined based on comparison of the balance scores. In a specific implementation, the higher the balance score, the better the arrangement of the nodes are balanced. In such a case, a pane number of the highest balance score is determined as the suitable number of panes. Depending on a specific structure of the computer network, the suitable number of panes may be different.

In step 514, a spatial coordinate of each node is determined based on the pane arrangement of the determined pane number and the ordering of the nodes in each hierarchical level. In some embodiments, the spatial coordinate of each node is determined by rotating, scaling, or flipping the pane(s), such that the nodes constituting the computer network fits in a certain frame size. In some embodiments, the location of the core node(s) is also shifted to a suitable position.

Figure 6:
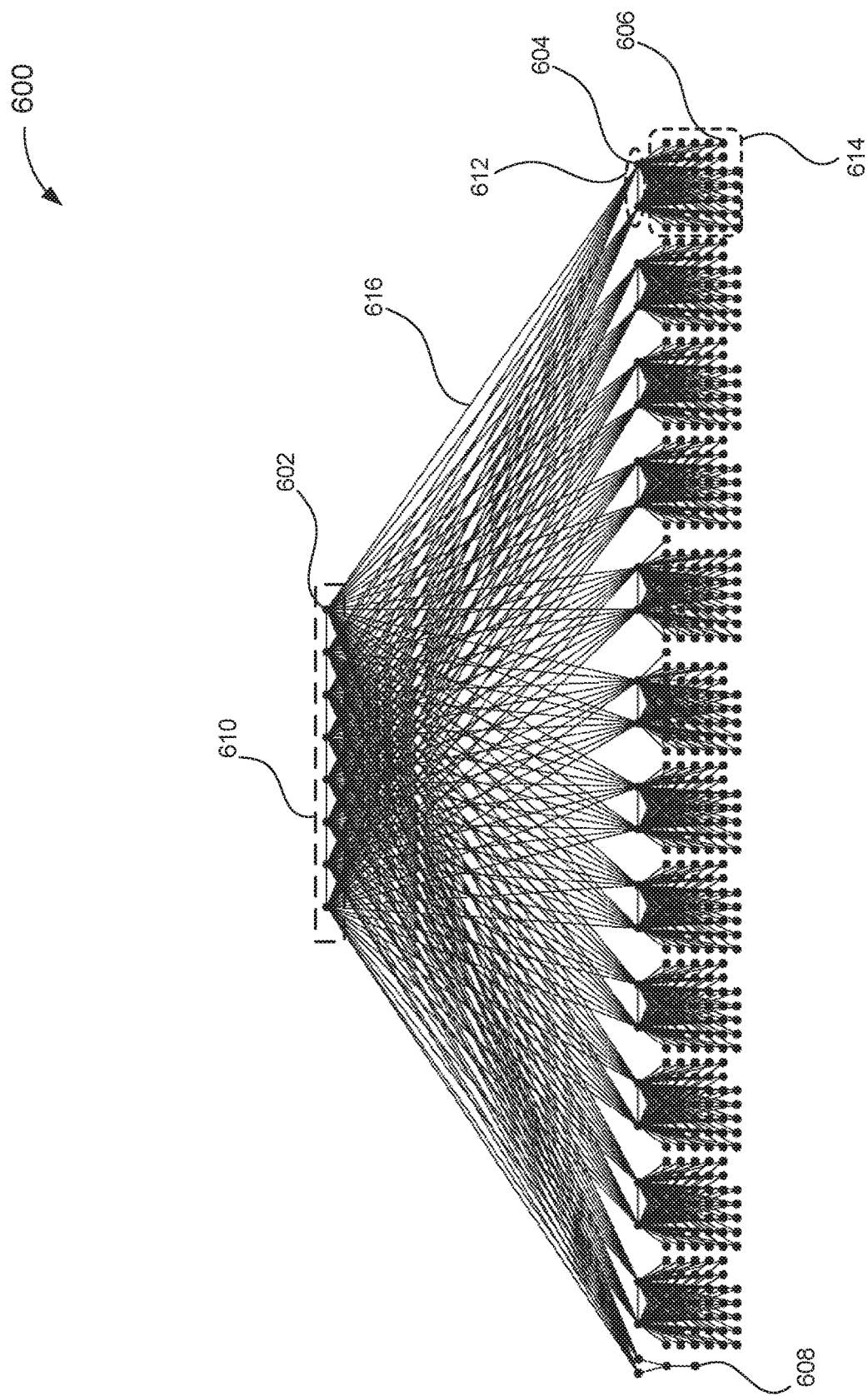
FIG. 6 schematically illustrates an example of a hierarchical graphical representation of a computer network structure configured in a top-down layout structure, according to some embodiments.

FIG. 6 schematically illustrates an example 600 of a hierarchical graphical representation of a computer network structure configured in a top-down layout structure, according to some embodiments. In the example 600 of the hierarchical graphical representation of the computer network structure, nodes constituting the computer network are represented by dots of a predetermined size, and categorized into four hierarchical levels. The nodes constituting the computer network include core nodes 602 at the highest hierarchical level (e.g., level 1), child nodes 604 of the core nodes 602 at the next highest hierarchical level (e.g., level 2), nodes 606 at the next highest hierarchical level (e.g., level 3), and a node 608 at the lowest hierarchical level (e.g., level 4). It is noted, here, that the nodes and supernodes depicted in FIG. 6 (and also FIGS. 7 and 8) with reference numerals are representative ones, and not all nodes and supernodes are depicted with reference numerals.

The core nodes 602 are grouped into a single core-supernode 610. The core nodes 602 are illustrated collectively at a higher position in the vertical direction and arranged in a horizontal direction. The spatial coordinates of the core nodes 602 are proximate to each other, such that the core nodes 602 can be intuitively recognized by the user as being grouped into a single core-supernode. The child nodes 604 of the core nodes 602 are grouped into multiple supernodes 612, each of which constitutes two child nodes 604. The nodes 606 do not have descendant nodes, (therefore are leaf nodes), and are grouped into multiple supernodes 614. Each group of nodes 606 grouped into the same supernode 614 is arranged in a box configuration, as opposed to a horizontal arrangement, such that the nodes 606 can be represented in a more compact manner. The node 608 at the lowest hierarchical level is an independent node that is not grouped into any supernode, and so as the parent node of the node 608.

Each of edges 616 indicating a direct connection between two nodes is represented by a straight line connecting the two nodes. Although the edges are illustrated in the same color as the nodes in FIG. 6 (and FIGS. 7 and 8), the edges may be displayed in a less conspicuous manner than the nodes. For example, the edges may be displayed in a gray color whereas the nodes may be displayed in a black color on a white background color (i.e., lower contrast with respect to the background). In another example, the edges may be displayed with a dotted line or smaller point than the dots. The edges tend to be more numerous than the nodes, and many crossing points of the edges might hinder the user to grasp the structure of the computer network, so it may be helpful to render edges in a less prominent manner. In addition, edges may be rendered with curved rather than straight lines.

Figure 7:
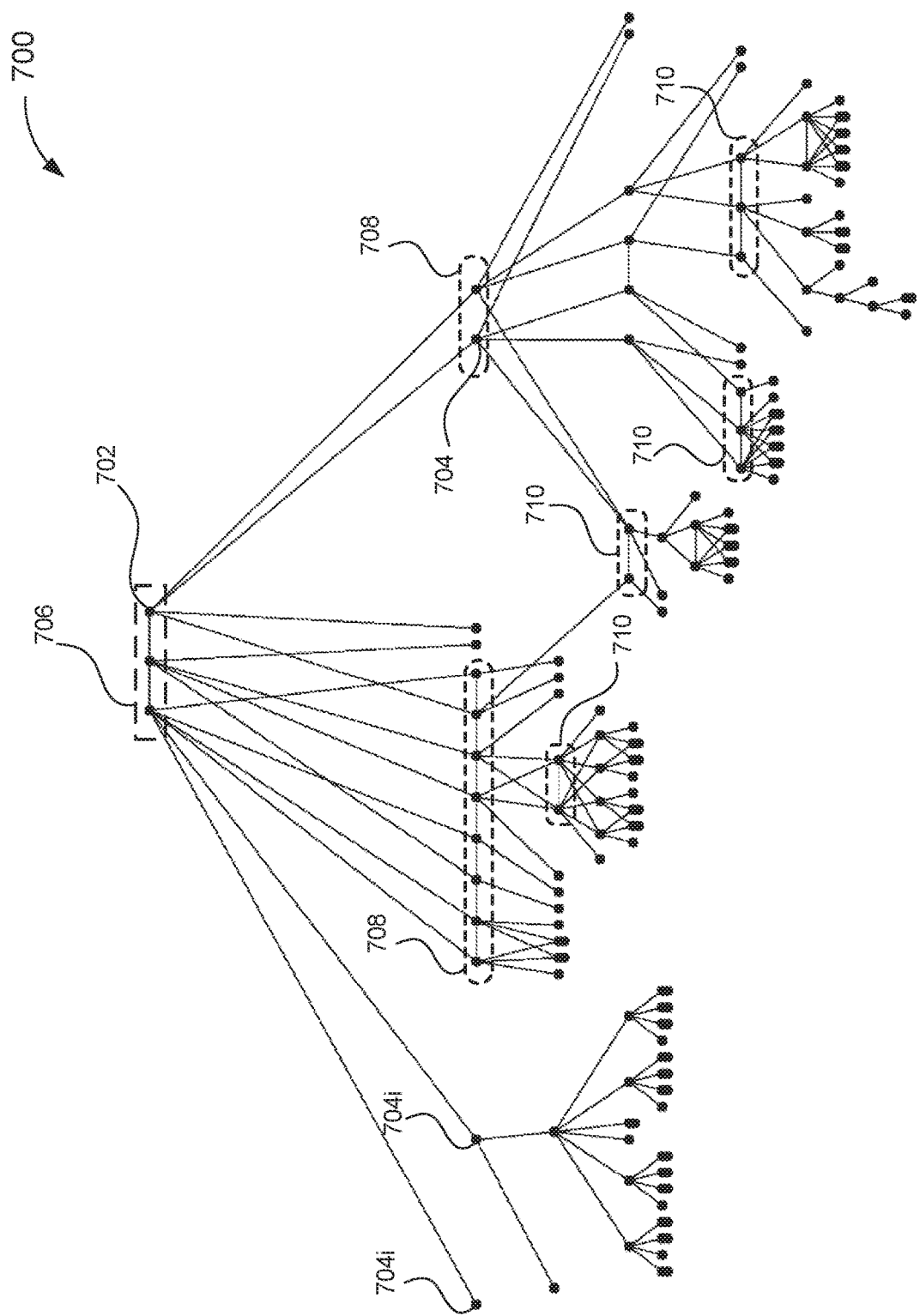
FIG. 7 schematically illustrates an example of a hierarchical graphical representation of another computer network structure configured in a top-down layout structure, according to some embodiments.

FIG. 7 schematically illustrates an example 700 of a hierarchical graphical representation of another computer network structure configured in a top-down layout structure, according to some embodiments. The example 700 of the hierarchical graphical representation is configured in substantially the same manner as the example 600 illustrated in FIG. 6. In the example 700 of the hierarchical graphical representation of the computer network structure, nodes constituting the computer network are represented by dots of a predetermined size, and categorized into multiple hierarchical levels. The nodes constituting the computer network include core nodes 702 at the highest hierarchical level, child nodes 704 of the core nodes 702 at the next highest hierarchical level, and nodes at the subsequent hierarchical levels.

The core nodes 702 are grouped into a single core-supernode 706. A part of the child nodes 704 of the core nodes 702 are grouped into multiple supernodes 708. Nodes in each of the supernodes 708 are arranged regularly at a predetermined distance therebetween. Each of the supernodes 708 and nodes therein are arranged such that cross points of edges representing direct connection among the nodes are minimized in the hierarchical graphical representation. Another part of the child nodes 704, which is illustrated with reference numeral 704*i*, is independent nodes that are not grouped into a supernode. The nodes at the subsequent hierarchical levels are also grouped into supernodes 710.

Figure 8:
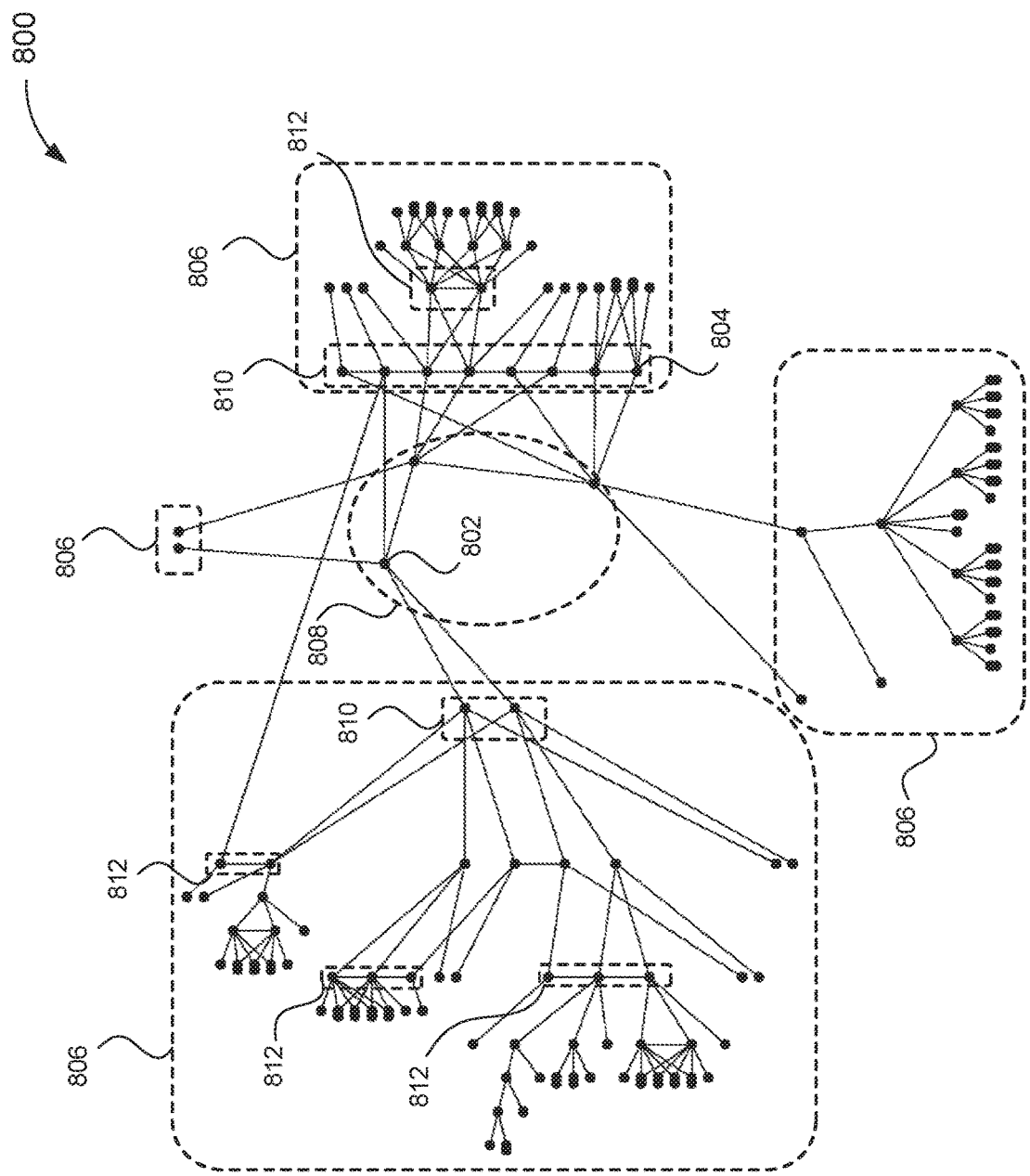
FIG. 8 schematically illustrates an example of a hierarchical graphical representation of the computer network structure same as that illustrated in FIG. 7 in a center-out layout structure, according to some embodiments.

FIG. 8 schematically illustrates an example 800 of a hierarchical graphical representation of the computer network structure same as that illustrated in FIG. 7 in a center-out layout structure, according to some embodiments. In the example 800 of the hierarchical graphical representation of the computer network structure, nodes constituting the computer network are represented by dots of a predetermined size, and categorized into multiple hierarchical levels. The nodes constituting the computer network include core nodes 802 at the highest hierarchical level, child nodes 804 of the core nodes 802 at the next highest hierarchical level, and nodes at the subsequent hierarchical levels.

The core nodes 802 are grouped into a single core-supernode 808. The child nodes 804 of the core nodes 802 are allocated to one of four planes 806 arranged at top, bottom, left, and right of the core nodes 802. A part of the child nodes 804 of the core nodes 802 are grouped into multiple supernodes 810. The nodes at the subsequent hierarchical levels are also grouped into supernodes 812. The supernodes 812 in FIG. 8 correspond to the supernodes 710 in FIG. 7.

The techniques described herein can be implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Figure 9:
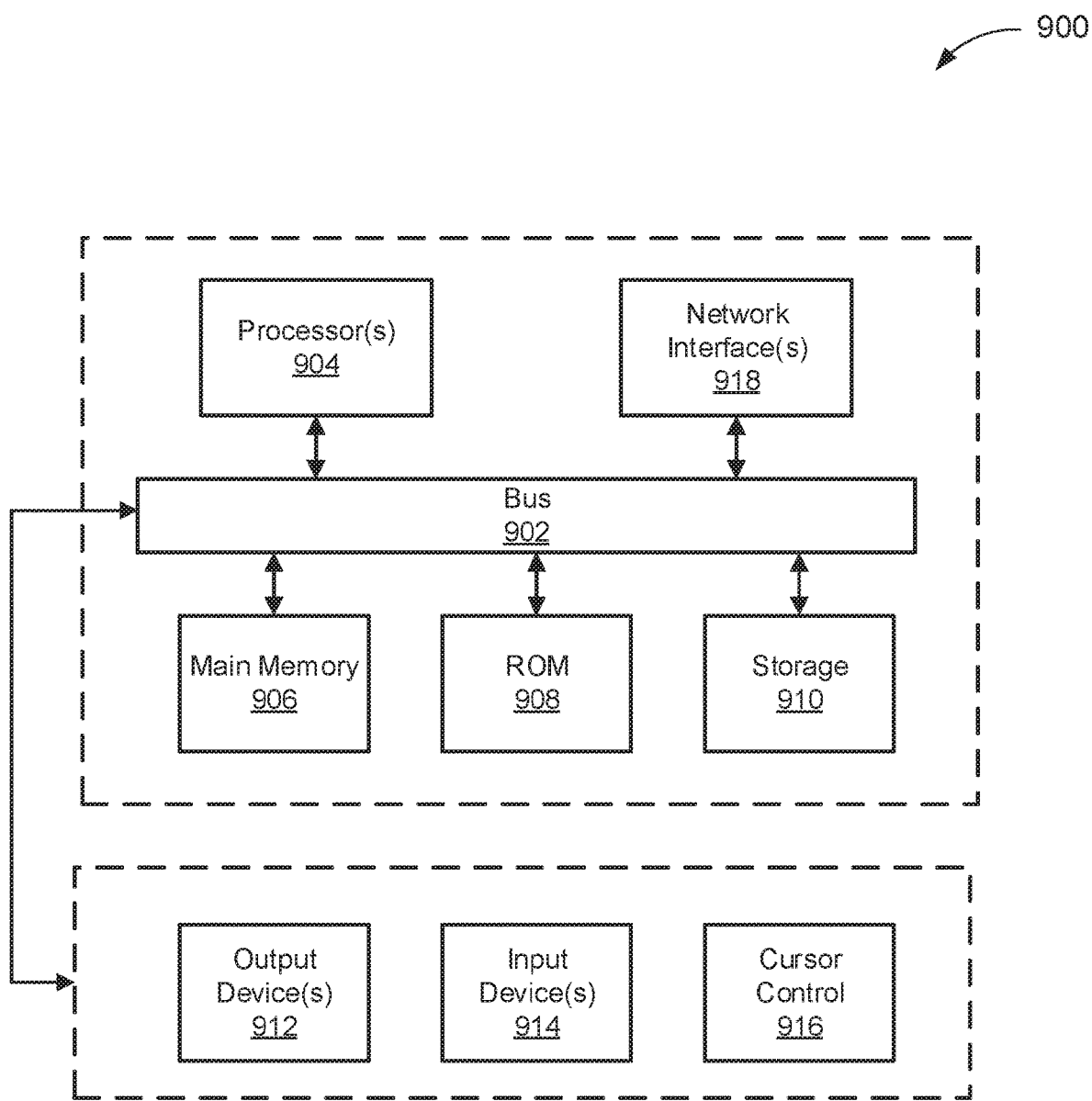
FIG. 9 is a block diagram illustrating hardware configuration of a computer system upon which any applicable components of a hierarchical graphical representation system described herein may be implemented.

FIG. 9 is a block diagram illustrating hardware configuration of a computer system 900 upon which any applicable components of a hierarchical graphical representation system described herein may be implemented. For example, the computer system 900 is applicable to hardware of the hierarchical graphic representation system 100 illustrated in FIG. 1. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections (e.g., user operations) to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may retrieves and executes the instructions. The instructions received by main memory 906 may optionally be stored on storage device 910 either before or after execution by processor 904.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet". Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process steps may be omitted in some implementations. The methods and processes described herein are also not limited to any particular sequence, and the steps or states relating thereto can be performed in other sequences that are appropriate. For example, described steps or states may be performed in an order other than that specifically disclosed, or multiple steps or states may be combined in a single step or state. The example steps or states may be performed in serial, in parallel, or in some other manner. Steps or states may be added to or removed from the disclosed example embodiments. The example systems and components described herein may be configured differently than described. For example, elements may be added to, removed from, or rearranged compared to the disclosed example embodiments.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method for automatically presenting a hierarchical graphical representation of a structure of a computer network, comprising:

obtaining network topology data including, with respect to each of a plurality of nodes constituting the computer network, an identifier of the node and an identifier of one or more nodes that are directly connected to the node;

determining at least one core node at a highest level in an hierarchy from the plurality of nodes based on the obtained network topology data;

grouping at least a part of non-core nodes among the plurality of nodes into one or more supernodes based on the obtained network topology data, each of the plurality of nodes being at only one hierarchical level in the hierarchy and included in at most one supernode, and each supernode consisting of two or more nodes at a same hierarchical level;

selecting, with respect each of the one or more supernodes, a single supernode or node that is connected thereto and at a hierarchical level immediately higher than thereof, as a parent node thereof;

determining a spatial coordinate of each of the plurality of nodes based on the at least one core node, the one or more supernodes, and the parent node of each of the one or more supernodes, wherein said determining the spatial coordinate of each of the plurality of nodes comprises:

determining an ordering of the one or more supernodes and an ordering of nodes in each of the one or more supernodes, with respect each hierarchical level of the hierarchy;

determining a horizontal location of each of the plurality of nodes in accordance with the ordering of the one or more supernodes and the ordering of the nodes in each of the one or more supernodes;

modifying a horizonal node arrangement of at least one of the one or more supernodes that consists of nodes having no child node into a box node arrangement; and determining the spatial coordinate of each of the plurality of nodes based on the determined horizontal location and the box node arrangement;

presenting the hierarchical graphical representation of the structure of the computer network, wherein the hierarchical graphical representation is in a top-down layout topology structure and each of the plurality of nodes is located at the determined spatial coordinate thereof;

receiving a user input designating an identifier of each of one or more of the plurality of nodes that are manually selected as one or more core nodes;

performing a comparison of the one or more core nodes determined based on the obtained network topology data and the one or more core nodes indicated by the user input; and modifying an algorithm to determine the one or more core nodes based on the obtained network topology data based on a result of the comparison through a machine learning process.

2. The method according to claim 1, wherein in the hierarchical graphical representation, nodes in each of the one or more supernodes are grouped together.

3. The method according to claim 2, wherein in the hierarchical graphical representation, the nodes in at least one of the one or more supernodes are arranged regularly at a predetermined distance therebetween.

4. The method according to claim 1, wherein the core node is selected as the parent node of at least one of the one or more supernodes.

5. The method according to claim 1, wherein the spatial coordinate is a two-dimensional coordinate, and the hierarchical graphical representation is a two-dimensional graphical representation.

6. The method according to claim 1, wherein said determining at least one core node comprises determining a node having a predetermined key string in the identifier thereof to be a core node.

7. The method according to claim 1, wherein said determining at least one core node comprises:

determining a centrality value of each of the plurality of nodes in accordance with betweenness centrality; and determining a node having a highest centrality value to be a core node.

8. The method according to claim 7, wherein said determining at least one core node comprises:

determining a predetermined number of nodes in a decremental order of the centrality value to be core nodes.

9. The method according to claim 7, wherein said determining at least one core node comprises:

determining a predetermined percentage of nodes in a decremental order of the centrality value to be core nodes.

10. The method according to claim 1, wherein the network topology data also includes a geographical location of at least a part of the plurality of nodes, and the core node is determined also based on the geographical location of at least the part of the plurality of nodes included in the network topology data.

11. The method according to claim 1, further comprises:

if a plurality of core nodes are determined, grouping the plurality of core nodes into a core-supernode representing a root in the hierarchy, wherein spatial coordinates of the plurality of core nodes are determined to be proximate to each other.

12. The method according to claim 1, wherein the spatial coordinate of at least a part of the plurality of nodes is determined such that cross points of edges representing direct connections among the nodes are minimized in the hierarchical graphical representation.

13. A non-transitory compute readable medium storing a program, when executed by a computer, configured to cause the computer to perform an operation for presenting a hierarchical graphical representation of a structure of a computer network, the operation comprising:

obtaining network topology data including, with respect to each of a plurality of nodes constituting the computer network, an identifier of the node and an identifier of one or more nodes that are directly connected to the node;

determining at least one core node at a highest level in an hierarchy from the plurality of nodes based on the obtained network topology data;

grouping at least a part of non-core nodes among the plurality of nodes into one or more supernodes based on the obtained network topology data, each of the plurality of nodes being at only one hierarchical level in the hierarchy and included in at most one supernode, and each supernode consisting of two or more nodes at a same hierarchical level;

selecting, with respect each of the one or more supernodes, a single supernode or node that is connected thereto and at a hierarchical level immediately higher than thereof, as a parent node thereof;

determining a spatial coordinate of each of the plurality of nodes based on the at least one core node, the one or more supernodes, and the parent node of each of the one or more supernodes, wherein said determining the spatial coordinate of each of the plurality of nodes comprises:

determining an ordering of the one or more supernodes and an ordering of nodes in each of the one or more supernodes, with respect each hierarchical level of the hierarchy;

determining a horizontal location of each of the plurality of nodes in accordance with the ordering of the one or more supernodes and the ordering of the nodes in each of the one or more supernodes;

modifying a horizonal node arrangement of at least one of the one or more supernodes that consists of nodes having no child node into a box node arrangement; and determining the spatial coordinate of each of the plurality of nodes based on the determined horizontal location and the box node arrangement;

operating to present the hierarchical graphical representation of the structure of the computer network, wherein the hierarchical graphical representation is in a top-down layout topology structure and each of the plurality of nodes is located at the determined spatial coordinate thereof;

receiving a user input designating an identifier of each of one or more of the plurality of nodes that are manually selected as one or more core nodes;

performing a comparison of the one or more core nodes determined based on the obtained network topology data and the one or more core nodes indicated by the user input; and modifying an algorithm to determine the one or more core nodes based on the obtained network topology data based on a result of the comparison through a machine learning process.

14. A computer system comprising:

a display;

a memory configured to store a program; and a processor configured to execute the program stored in the memory to perform an operation for presenting a hierarchical graphical representation of a structure of a computer network, the operation comprising:

obtaining network topology data including, with respect to each of a plurality of nodes constituting the computer network, an identifier of the node and an identifier of one or more nodes that are directly connected to the node;

determining at least one core node at a highest level in an hierarchy from the plurality of nodes based on the obtained network topology data;

grouping at least a part of non-core nodes among the plurality of nodes into one or more supernodes based on the obtained network topology data, each of the plurality of nodes being at only one hierarchical level in the hierarchy and included in at most one supernode, and each supernode consisting of two or more nodes at a same hierarchical level;

selecting, with respect each of the one or more supernodes, a single supernode or node that is connected thereto and at a hierarchical level immediately higher than thereof, as a parent node thereof;

determining a spatial coordinate of each of the plurality of nodes based on the at least one core node, the one or more supernodes, and the parent node of each of the one or more supernodes, wherein said determining the spatial coordinate of each of the plurality of nodes comprises:

determining an ordering of the one or more supernodes and an ordering of nodes in each of the one or more supernodes, with respect each hierarchical level of the hierarchy;

determining a horizontal location of each of the plurality of nodes in accordance with the ordering of the one or more supernodes and the ordering of the nodes in each of the one or more supernodes;

modifying a horizonal node arrangement of at least one of the one or more supernodes that consists of nodes having no child node into a box node arrangement, and determining the spatial coordinate of each of the plurality of nodes based on the determined horizontal location and the box node arrangement;

controlling the display to display the hierarchical graphical representation of the structure of the computer network, the hierarchical graphical representation being in a top-down layout topology structure and each of the plurality of nodes being located at the determined spatial coordinate thereof;

receiving a user input designating an identifier of each of one or more of the plurality of nodes that are manually selected as one or more core nodes;

performing a comparison of the one or more core nodes determined based on the obtained network topology data and the one or more core nodes indicated by the user input; and modifying an algorithm to determine the one or more core nodes based on the obtained network topology data based on a result of the comparison through a machine learning process.

\* \* \* \* \*